US012618760B2

(12) United States Patent
Machens et al.

(10) Patent No.: US 12,618,760 B2
(45) Date of Patent: May 5, 2026

(54) TEST RIG AND TEST SETUP FOR TESTING A SAFETY BELT SYSTEM AND/OR FOR TESTING COMPONENTS OF A SAFETY BELT SYSTEM, AND METHOD FOR OPERATING A TEST RIG

(71) Applicant: ZF AUTOMOTIVE GERMANY GMBH, Alfdorf (DE)

(72) Inventors: Kai-Ulrich Machens, Stuttgart (DE); Bartholomäus Brylka, Stuttgart (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 454 days.

(21) Appl. No.: 17/925,856

(22) PCT Filed: May 18, 2021

(86) PCT No.: PCT/EP2021/063084
§ 371 (c)(1),
(2) Date: Nov. 17, 2022

(87) PCT Pub. No.: WO2021/239505
PCT Pub. Date: Dec. 2, 2021

(65) Prior Publication Data
US 2023/0194402 A1 Jun. 22, 2023

(30) Foreign Application Priority Data
May 25, 2020 (DE) ..................... 10 2020 113 887.3

(51) Int. Cl.
G01N 3/10 (2006.01)
G01N 3/04 (2006.01)
(52) U.S. Cl.
CPC ................. G01N 3/10 (2013.01); G01N 3/04 (2013.01)

(58) Field of Classification Search
CPC .................................. G01N 3/08; G01N 3/10
See application file for complete search history.

(56) References Cited

U.S. PATENT DOCUMENTS

| | | | | |
|---|---|---|---|---|
| 4,630,472 | A | | 12/1986 | Zimmerman et al. |
| 5,929,348 | A | * | 7/1999 | Stein ................. G01M 17/0078 |
| | | | | 73/12.07 |
| 2013/0233050 | A1 | | 9/2013 | Kral et al. |

FOREIGN PATENT DOCUMENTS

| | | |
|---|---|---|
| CN | 206192666 U | 5/2017 |
| CN | 206311345 U | 7/2017 |

(Continued)

OTHER PUBLICATIONS

PCT International Search Report for corresponding Internation Application Serial No. PCT/EP2021/063084, mailed Aug. 27, 2021, pp. 1-4.

*Primary Examiner* — Walter L Lindsay, Jr.
*Assistant Examiner* — Andrew V Do
(74) *Attorney, Agent, or Firm* — Tarolli, Sundheim, Covell & Tummino LLP

(57) ABSTRACT

The invention describes a test rig (10) for testing a seat belt system and/or for testing components of a seat belt system. Said test rig (10) comprises a test rig base (12), a holding unit (18) for mounting a seat belt system to be tested and/or components to be tested of a seat belt system, an impact unit (16) configured to apply load to a seat belt system to be tested, and a linear drive unit (20). The invention further presents a test setup comprising such test rig (10). In addition, the invention provides a method for operating such test rig (10).

17 Claims, 13 Drawing Sheets

(56) References Cited

FOREIGN PATENT DOCUMENTS

| DE | 2750296 | A1 | 5/1979 |
|----|---------|----|--------|
| DE | 19961378 | A1 | 6/2001 |
| DE | 102019115428 | A1 | 5/2020 |

* cited by examiner

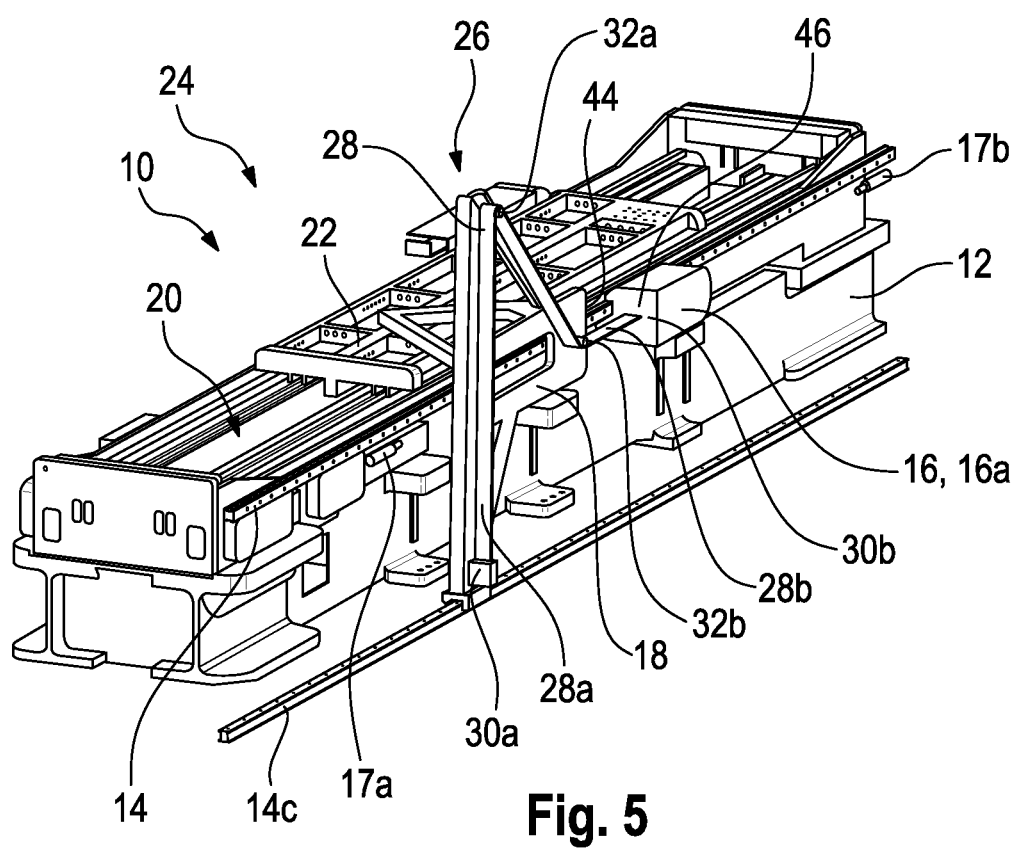
Fig. 5
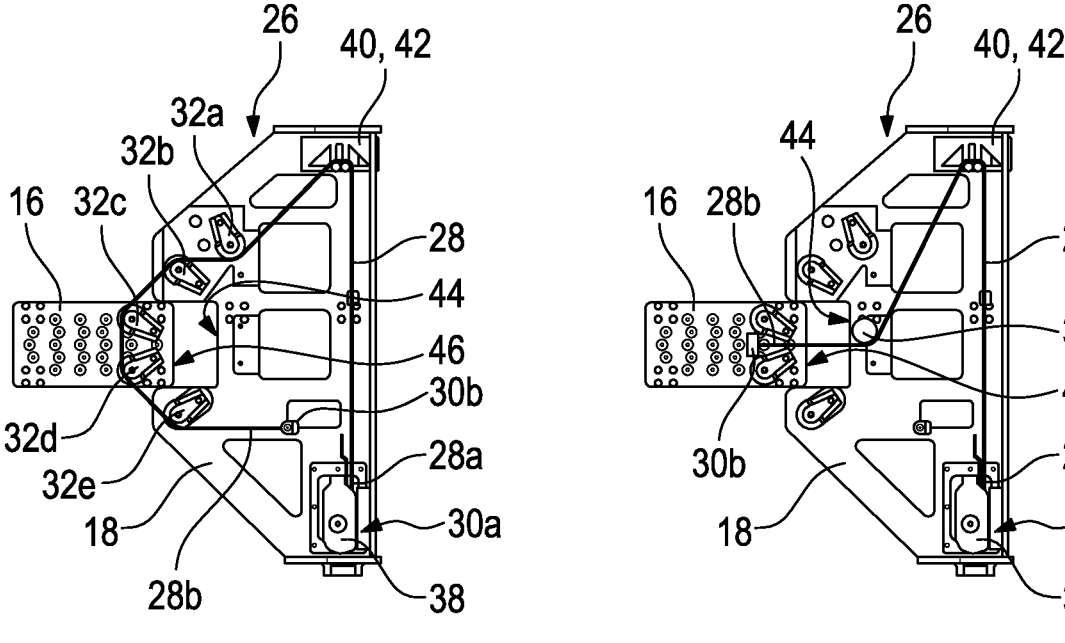
Fig. 6                    Fig. 7

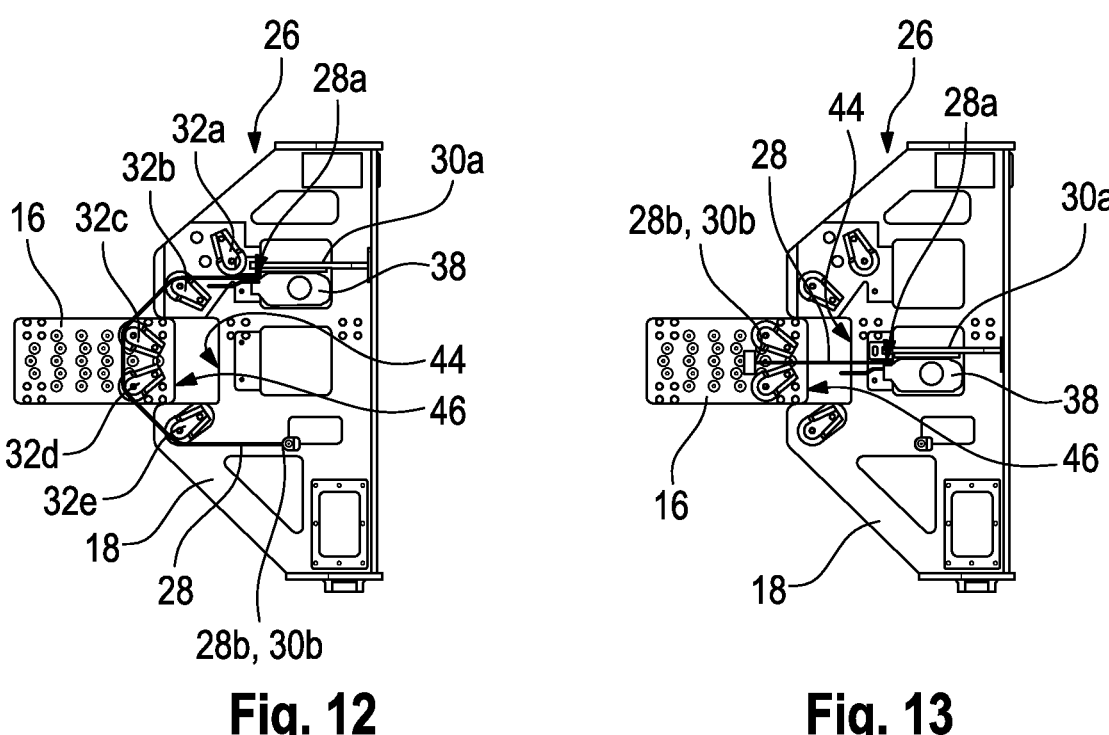
Fig. 12          Fig. 13
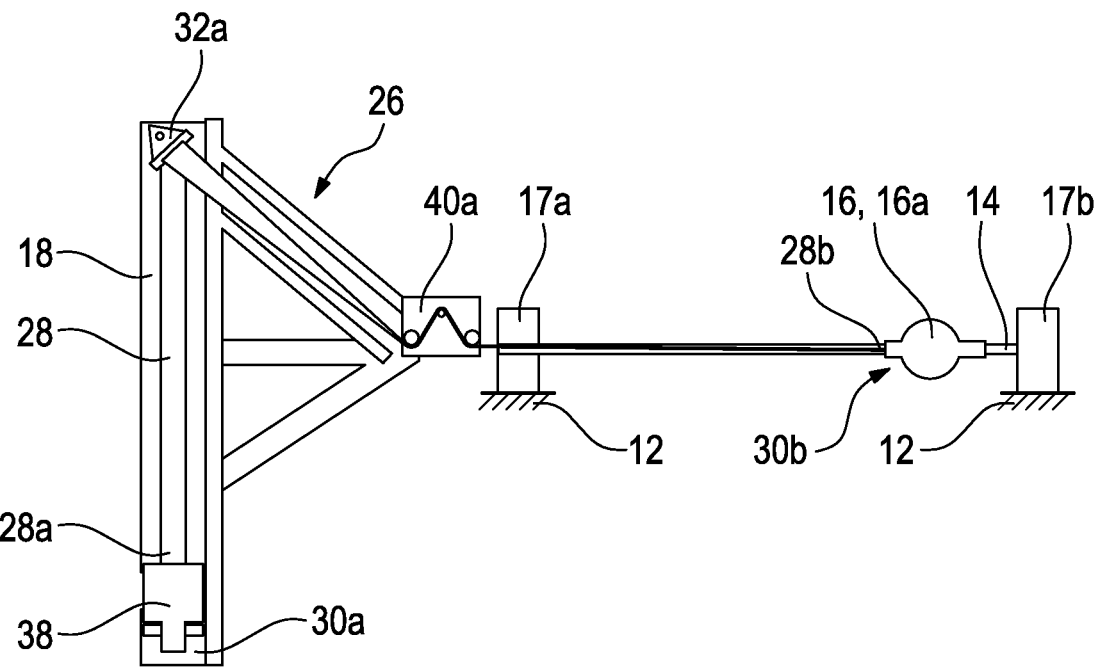
Fig. 14

TEST RIG AND TEST SETUP FOR TESTING A SAFETY BELT SYSTEM AND/OR FOR TESTING COMPONENTS OF A SAFETY BELT SYSTEM, AND METHOD FOR OPERATING A TEST RIG

RELATED APPLICATIONS

This application is a U.S. National Stage Application filed under 35 USC 371, claiming priority to Serial No. PCT/EP2021/063084, filed on 18 May 2021; which claims priority from German Patent Application DE 10 2020 113 887.3, filed 25 May 2020, the entireties of which are hereby incorporated herein by reference.

TECHNICAL FIELD

The invention relates to a test rig for testing a seat belt system and/or for testing components of a seat belt system, the test rig comprising a test rig base and a holding unit for arranging a seat belt system to be tested and/or components to be tested of a seat belt system.

BACKGROUND

The invention further relates to a test setup for testing a seat belt system and/or for testing components of a seat belt system comprising such test rig. Accordingly, a seat belt system including a webbing is fastened to the holding unit.

In addition, the invention relates to a method for operating such test rig, wherein a seat belt system that comprises a webbing is fastened to the holding unit.

Test rigs of this type, test setups adapted to be realized with said test rigs and methods for operating a test rig are known from the state of the art.

They serve to simulate loads as realistically as possible which during operation of a seat belt system act on the same and on the components of the seat belt system. It is generally endeavored to design test rigs in such universal manner that a seat belt system can be tested in different arrangement variants corresponding to different installation locations of the seat belt system in a vehicle, e.g., installation in the B pillar, installation in a backrest. Moreover, it is usually desired that seat belt systems under test can be tested in different load scenarios. At the same time, test rigs are intended to have a compact design. This applies particularly to a floor space required for the test rig.

It is understood that the afore-mentioned requirements to test rigs are conflicting. Specifically, it is a conflict of aims that test rigs by which a plurality of arrangement variants and/or load scenarios can be realized usually require a large space. On the other hand, known test rigs of compact design allow to realize only few arrangement variants, specifically only one arrangement variant and/or only one load scenario.

SUMMARY

Consequently, it is the object of the invention to eliminate or at least mitigate the afore-mentioned conflict of aims. Accordingly, specifically a test rig is to be provided which is universally applicable as regards arrangement variants and load scenarios to be realized and at the same time has a compact design.

The object is achieved by a test rig of the type mentioned in the beginning which comprises an impact unit configured to apply dynamic load to a seat belt system to be tested, and, in so doing, to take the reaction of the seat belt system, particularly in interaction with elasticity and inertia, into account via the impact unit. On the whole, such a test rig helps take the actual interaction of the individual elements of the seat belt system by far more realistically into account. The impact unit is supported, in the operating state of the test rig, to be substantially horizontally movable on the test rig base via a linear guide. In addition, the test rig includes a controlled linear drive unit comprising a drive interface. Accordingly, the holding unit is optionally fixed relative to the test rig base or is drivingly connected rigidly to the linear drive unit via the drive interface. The impact unit is drivingly connectable rigidly to the linear drive unit via the drive interface. The impact unit is thus always supported on the test rig base via the linear guide. Optionally, it is drivingly connected rigidly to the linear drive unit via the drive interface or is disconnected from the linear drive unit. In the latter case, the impact unit is substantially freely displaceable along the linear guide. The holding unit is either stationary relative to the test rig base or is connected to the linear drive unit via the drive interface. From the afore-mentioned coupling options, a large number of load scenarios is resulting which can be implemented by means of the test rig. The linear drive unit which is substantially freely programmable also contributes to this. This means that the linear drive unit is configured to follow any distance, speed and/or acceleration profiles in a controlled manner. Specifically, a crash pulse known from a vehicle crash is tracked. The acceleration over time is not constant or not uniform in the normal case. In addition, at the holding unit a seat belt system to be tested and/or components to be tested of a seat belt system can be disposed in almost any way. In other words, the test rig is configured to implement almost any arrangement variants of seat belt systems. Generally, a universal test rig as regards the load scenarios and the arrangement variants is resulting. Since linear drive units are usually compact, also the test rig has a generally compact design.

The holding unit can be designed in one part or in several parts. In the latter case, for example two parts of the holding unit can be positioned at different spaces from each other. The multi-part design thus offers a further setting option so as to simulate additional arrangement variants of a seat belt system on the holding unit.

Preferably, the impact unit comprises a test mass. A test mass is understood to be a mass which, on the one hand, acts upon the seat belt system to be tested or the components to be tested indirectly or directly and, on the other hand, is selected as to its size such that a desired test load results from the impact of the test mass. By selecting the test mass to be differently large, different load scenarios can be realized.

In this context, the impact unit can have a base to which mass elements can be fastened in a modular manner to obtain a desired test mass. It is also possible to use a mass of the impact unit itself as test mass. In other words, the test mass may be integrated in the impact unit. In this variant, too, the test mass can be varied by mounting additional mass elements on the impact unit.

In one embodiment, the linear drive unit comprises an electric drive system. Linear drive units of this type are frequently referred to as electric linear axes. The electric drive system can comprise an electric linear motor. It is equally possible that the drive system comprises a rotationally operating electric motor the rotational output movement is converted to a linear movement via a gearing such as a spindle drive. Those linear drive units have a compact design. Moreover, they can be easily controlled so that the afore-mentioned distance, speed and/or acceleration profiles can be easily implemented.

As an alternative, the linear drive unit comprises a hydraulic drive system. Those drive systems also have a compact design and can be easily controlled.

On the holding unit and/or on the impact unit, at least one wrapping element can be fastened, each wrapping element including at least one wrapping surface for frictional inter-action with a webbing. Accordingly, the wrapping element substantially has a cylindrical or partly cylindrical design, for example, with a cylindrical outer surface or a portion thereof forming the wrapping surface. Thus, the wrapping elements serve for simulating frictional contacts of a web-bing on the test rig. In reality, those contacts occur, for example, in the interaction of the webbing with the deflector and the seat belt tongue but also with a vehicle occupant and/or components of the vehicle such as a seat. The wrapping elements can be adapted as to their numbers and positions substantially in any way both on the holding unit and on the impact unit. Thus, any real operating situations of the webbing can be simulated on the test rig with the aid of the wrapping elements in a simple manner.

Alternatively, or additionally, the holding unit and/or the impact unit has/have a fastening interface, wherein each fastening interface is configured to fix a webbing and/or to fix a belt retractor. In other words, at least one end of the webbing is fastened either directly to the holding unit or to the impact unit, or is fastened via a belt retractor to the holding unit and, resp., to the impact unit. An associated position of the webbing end and, resp., of the belt retractor can be selected substantially freely on the holding unit and on the impact unit. Also in this way, any operating scenarios of a seat belt system can be simulated in a simple manner by means of the test rig. By appropriately arranging the wrap-ping elements relative to each other, also the kinematics between the linearly guided impact unit and the webbing retraction is additionally influenced and can thus be adjusted for a specific load case.

Preferably, in this context, a local stiffening element is provided at the positions where the webbing is fastened to the holding unit and/or to the impact unit. The stiffening element is interposed between the webbing end or, resp., the webbing retractor and the holding unit or, resp., the impact unit. In this way, the holding unit and the impact unit can be designed to be generally light-weight. The local stiffening element helps stiffen the structure thereof merely locally where it is required to absorb the reaction forces. By appropriately removing local connecting elements at other possible connecting points which are not being used in the test setup considered, weight can be saved. Consequently, while a linear drive unit is constant, the holding unit and/or the impact unit can be moved highly dynamically. This means that within short periods of time high accelerations and/or high speeds of said elements can be realized.

Also, the holding unit and/or the impact unit can include at least one deflecting unit for deflecting a webbing. Such deflecting units can be roughly divided into two variants. On the one hand, the deflecting units provided on the test rig serve for simulating deflections of the webbing in real operation. On the other hand, deflecting units can be used particularly on and close to the impact unit for influencing the kinematics between the linearly guided impact unit and the retracted webbing. By loops laid in a defined manner or a clamped webbing which releases when a defined tensile force in the webbing is exceeded, a belt slack can be imitated between the deflecting units. In real operation, a loose part of the webbing which is not adjacent to the body of a vehicle occupant is understood by a belt slack. The deflecting unit again can be positioned at will on the holding unit and/or on the impact unit. Thus, also under this aspect, any setup variants of the seat belt system can be implemented on the test rig.

Equally, the holding unit and/or the impact unit and/or the webbing can be provided to include at least one sensor unit. In particular, the sensor unit comprises a force measuring unit, an acceleration measuring unit, a speed measuring unit and/or a distance measuring unit. The sensor unit can be optionally coupled to the seat belt system and/or to compo-nents thereof. Hence, by means of the sensor unit sensor values can be detected indirectly or directly by which a load exerted by the test rig on the seat belt system or the components of the seat belt system can be characterized. Accordingly, both acceleration, speed and/or distance of the webbing can be measured relative to the holding unit, but also acceleration, speed and/or distance, e.g., of the impact unit can be measured relative to the test rig. The sensor unit, too, can be positioned substantially freely on the holding unit and/or the impact unit.

In one variant, the holding unit includes a carrier surface and the impact unit includes a carrier counter-surface so that the holding unit can carry the impact unit along the linear guide, when the carrier counter-surface is adjacent to the carrier surface. Said driving works, as a matter of course, only when the holding unit moves with the carrier surface in the direction of the carrier counter-surface. Thus, test sce-narios can be realized in which the impact unit is initially driven by the holding unit and then the holding unit is removed from or lifted off the impact unit. The impact unit may be provided with a test mass. In this way, the variance of feasible test scenarios is further increased.

Advantageously, the drive interface comprises a decou-pling mechanism so that even during movement a drivingly rigid connection of the linear drive unit to the impact unit or to the holding unit can be cancelled. In particular, the impact unit can be moved initially by means of the linear drive unit to a specific position, can be brought to a specific speed and/or can be provided with a specific acceleration. After that, the impact unit is decoupled from the linear drive unit and moves along the linear guide corresponding to inertia forces acting on the same. This, too, serves for providing numerous load scenarios.

According to one alternative, a limit stop for limiting a moving range of the impact unit along the linear guide is provided. In particular, the limit stop is provided with a damping unit. Specifically, two limit stops of this type are provided by means of which the moving range of the impact unit is limited on both sides. The impact unit is thus displaceable merely between said two limit stops along the linear guide. It is excluded that the impact unit is undesirably released from the linear guide. This is especially applicable when the impact unit comprises a test mass. Moreover, the damping unit helps decelerate the impact unit at the end of the associated moving range. In both variants, i.e., with and without a damping unit, the impact unit can be displaced within the entire associated moving range at high speeds and/or high accelerations. Thus, the test rig can have a compact design, as particularly no exit areas for the impact unit have to be provided.

The limit stop may be disposed relative to the holding unit such that it prevents the holding unit from being contacted by the impact unit. In other words, the limit stop is disposed along the linear guide between the impact unit and the holding unit. Thus, the impact unit is excluded from acting undesirably upon the holding unit and/or a seat belt system secured thereto. This serves for the reliable operation of the test rig.

Further, the object is achieved by a test setup of the above-mentioned type which comprises a test rig according to the invention. The impact unit is coupled to the holding unit via the webbing. For this purpose, either one end of the webbing may be secured to the impact unit and the opposite end of the webbing may be secured to the holding unit. As an alternative, it is possible to secure both ends to the holding unit and to couple the impact unit to the holding unit only via a webbing portion located between the two ends. In this way, numerous load scenarios can be simulated by means of the test rig.

Also, the object is achieved by a method of the above-mentioned type, wherein a seat belt system comprising a webbing is secured to the holding unit. In a first alternative, the holding unit is stationary relative to the test rig base and the impact unit exerts a load on the webbing by being brought into contact with the webbing by means of the linear drive unit. In a second alternative, the holding unit is stationary relative to the test rig base and the impact unit is both coupled to the holding unit via the webbing and drivingly connected rigidly to the linear drive unit via the drive interface. Accordingly, the impact unit effectuates a load of the webbing by the impact unit being moved using the linear drive unit. In a third alternative, the holding unit is drivingly connected to the linear drive unit and the impact unit is coupled to the holding unit via the webbing. In that case, loading of the webbing is caused by displacing the holding unit by means of the linear drive unit. In order to test the seat belt system and/or components thereof, numerous load scenarios are thus provided.

Accordingly, also the holding unit can be stationary relative to the test rig base and the impact unit can first be accelerated by means of the linear drive unit and can then be decoupled from the linear drive unit. Decoupling is completed before the impact unit gets in contact with the webbing to cause loading of the webbing. When the impact unit gets in contact with the webbing, it therefore moves substantially freely, i.e., decoupled from the linear drive unit, along the linear guide. Such loading of the webbing is very realistic.

In one variant of the method, the holding unit is drivingly connected rigidly to the linear drive unit and the impact unit is coupled to the holding unit via the webbing. Then, first the holding unit is moved by means of the linear drive unit toward the impact unit while carrying the impact unit. Subsequently, the holding unit is decelerated by means of the linear drive unit or is moved in a direction facing away from the impact unit to cause loading of the webbing. At the moment of the loading of the webbing, the holding unit and the impact unit thus move in opposite directions. In this way, particularly high loads can be introduced to the webbing in a small space, specifically by moving the holding unit and the impact unit at a particularly high relative speed. Moreover, in this way complex load scenarios resulting from interaction of an active safety device (pre-safe devices), e.g., a belt tensioner, and a collision can be simulated on the test rig.

BRIEF DESCRIPTION OF THE DRAWINGS

In the following, the invention shall be illustrated on the basis of various embodiments shown in the attached drawings, wherein:

FIG. 5 shows a test setup comprising the test rig of FIG. 1 in a second configuration with the holding unit being moved along and direct coupling of the impact unit, FIG. 6 to FIG. 13 show detail views of different alternatives to the first and, resp., second configuration of the test setup of FIG. 5, FIG. 14 to FIG. 16 show detail views of different alternatives to the third configuration of the test setup of FIG. 4.

DESCRIPTION

Figure 1:
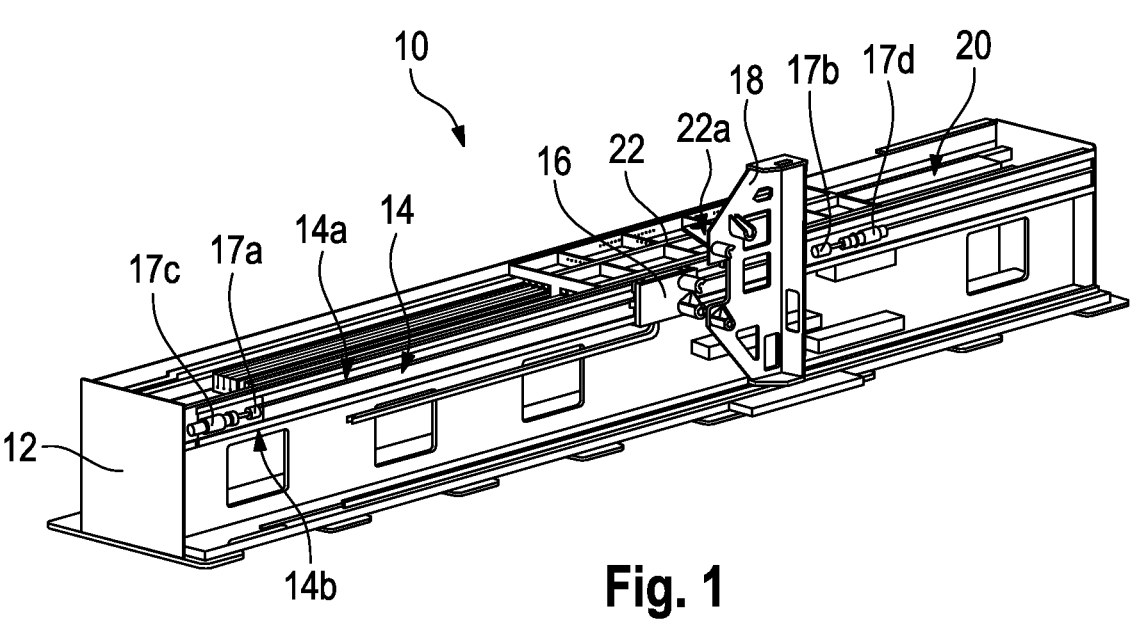
FIG. 1 shows a test rig according to the invention in a perspective view with the holding unit being moved along.

FIG. 1 shows the test rig 10 for testing a seat belt system not shown in detail and/or for testing components of a seat belt system also not shown in detail in FIG. 1.

The test rig 10 comprises a test rig base 12 which, in the broadest sense, can also be referred to as machine bed and is stationary.

On a lateral surface of the test rig base 12 a linear guide 14 is provided which, in the shown embodiment, comprises a first upper linear guide rail 14a, a second central linear guide rail 14b and a third lower linear guide rail 14c. The impact unit 16 is guided via the linear guide rails 14a and 14b and the holding unit 18 is guided via the linear guide rails 14a and 14c.

In the operating state of the test rig 10, i.e., when the test rig 10 is mounted and operational, the linear guide 14 serves for horizontal guiding. Accordingly, the linear guide rails 14a, 14b and 14c extend substantially horizontally.

An impact unit 16 which is configured to apply load to a seat belt system to be tested and/or to components to be tested of a seat belt system is coupled to the linear guide 14.

The impact unit 16 is thus supported to be horizontally movable on the test rig base 12.

A moving area of the impact unit 16 is limited by two limit stops 17a, 17b each being equipped with a damping unit 17c, 17d. The impact unit 16 is thus movable only between said two limit stops 17a, 17b.

Moreover, the impact unit 16 comprises a test mass. This means that the impact unit 16 has a specific mass or is connected to such mass which serves to apply load to the seat belt system to be tested and/or the components to be tested. If required, additional mass bodies can be mounted to the impact unit 16.

Also, a holding unit 18 is provided which serves for holding a seat belt system to be tested and/or components to be tested of a seat belt system. In other words, seat belt systems to be tested and/or components to be tested of a seat belt system can be mounted to the holding unit 18.

The test rig 10 further comprises a linear drive unit 20 integrated in the test rig base 12 in the shown embodiment.

The linear drive unit 20 comprises one or more electric linear motors which can be controlled in a substantially freely programmed manner and, thus, can track any distance, speed and/or acceleration profiles.

The linear drive unit 20 further includes a drive interface 22 which, in the shown embodiment, is a linearly movable slide. The design of the slide and of the coupling is selected such that both the masses and the moments are minimized.

Optionally, the drive interface 22 can be drivingly connected rigidly to the holding unit 18. This case is illustrated in FIG. 1. Hence the holding unit 18 is drivingly connected rigidly to the linear drive unit 20 and as a result is linearly movable by means of the linear drive unit 20.

The drive interface 22 also comprises a decoupling mechanism 22a adapted to release a drivingly rigid connection of the linear drive unit 20 and the impact unit 16 and/or the holding unit 18 both at standstill and during movement.

As an alternative, the linear drive unit 20 can also be drivingly connected rigidly to the impact unit 16 via the drive interface 22. This is not the case in the representation according to FIG. 1 but will be illustrated on the basis of the following configurations of the test rig 10.

Figure 2:
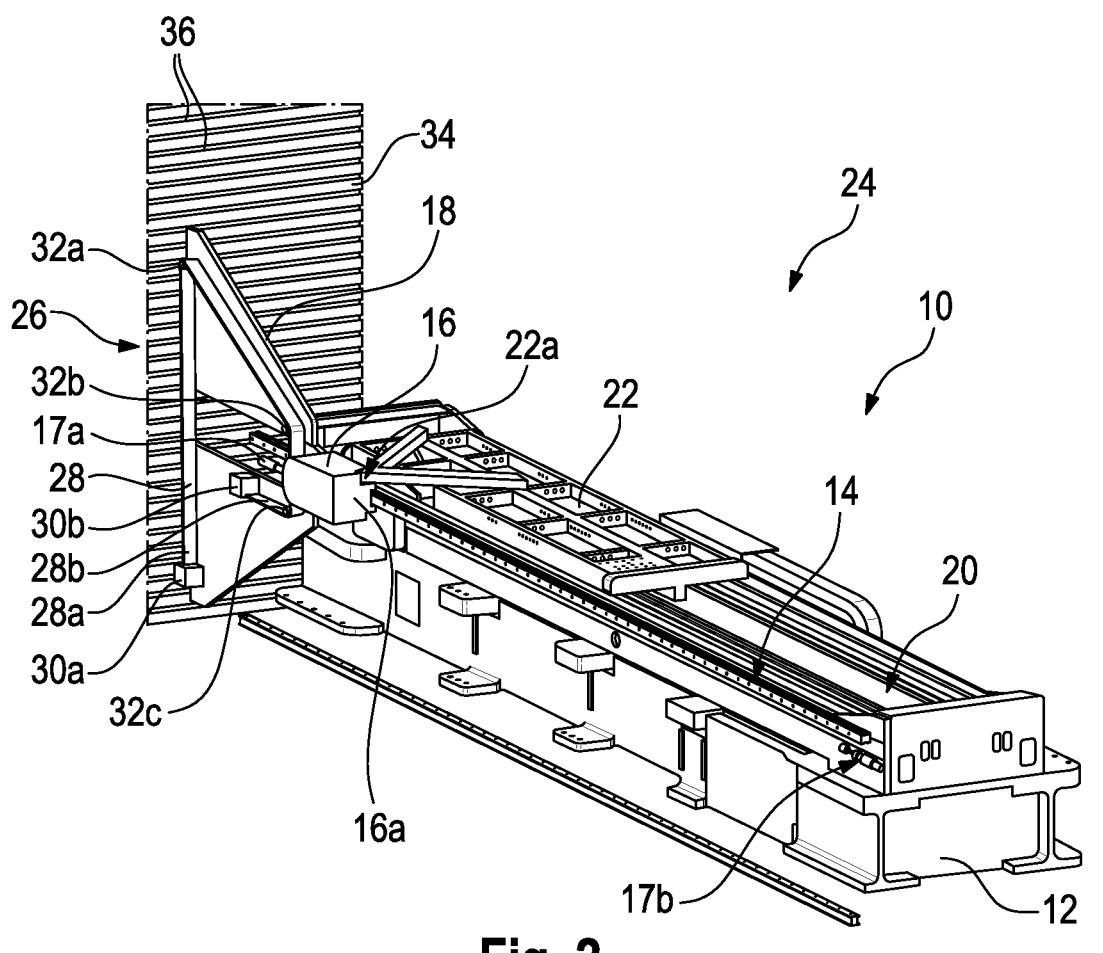
FIG. 2 shows a test setup comprising the test rig of FIG. 1 in a first configuration with a stationary holding unit.

FIG. 2 illustrates a test setup 24 according to a first configuration for testing a seat belt system and/or for testing components of a seat belt system.

The test setup 24 comprises the test rig of FIG. 1.

A seat belt system 26 is attached to the holding unit 18.

In the following examples, the seat belt system 26 constitutes the object under test. It is understood that alternatively it may be a matter of testing merely individual components of the seat belt system 26. In this case, too, a seat belt system 26 is attached to the holding unit. Said seat belt system may be excluding the components not required for testing, however.

The seat belt system 26 comprises a webbing 28 the first end 28a of which is attached to the holding unit 18 via a first attachment interface 30a.

A second end 28b of the webbing 28 is connected to the holding unit 18 via a second attachment interface 30b.

Moreover, a total of three wrapping elements 32a, 32b, 32c are provided on the holding unit 18. Each wrapping element 32a, 32b, 32c includes, at its outer periphery, a wrapping surface via which the webbing 28 is put against the wrapping element 32a, 32b, 32c so that it is in frictional interaction with the respective wrapping element 32a, 32b, 32c.

In the first configuration, the holding unit 18 is stationary relative to the test rig base 12.

In the shown embodiment, for this purpose the holding unit 18 is attached to a positioning unit 34 which allows to precisely and easily position the holding unit 18 relative to the test rig base 12 via its numerous fastening grooves 36. For reasons of clarity, only some of the fastening grooves 36 are provided with a reference numeral.

In addition, the impact unit 16 is drivingly connected rigidly to the linear drive unit via the drive interface 22.

The impact unit 16 also comprises a test mass that is realized, in the shown embodiment, by a substantially box-shaped mass element 16a attached to the impact unit 16.

Figure 3:
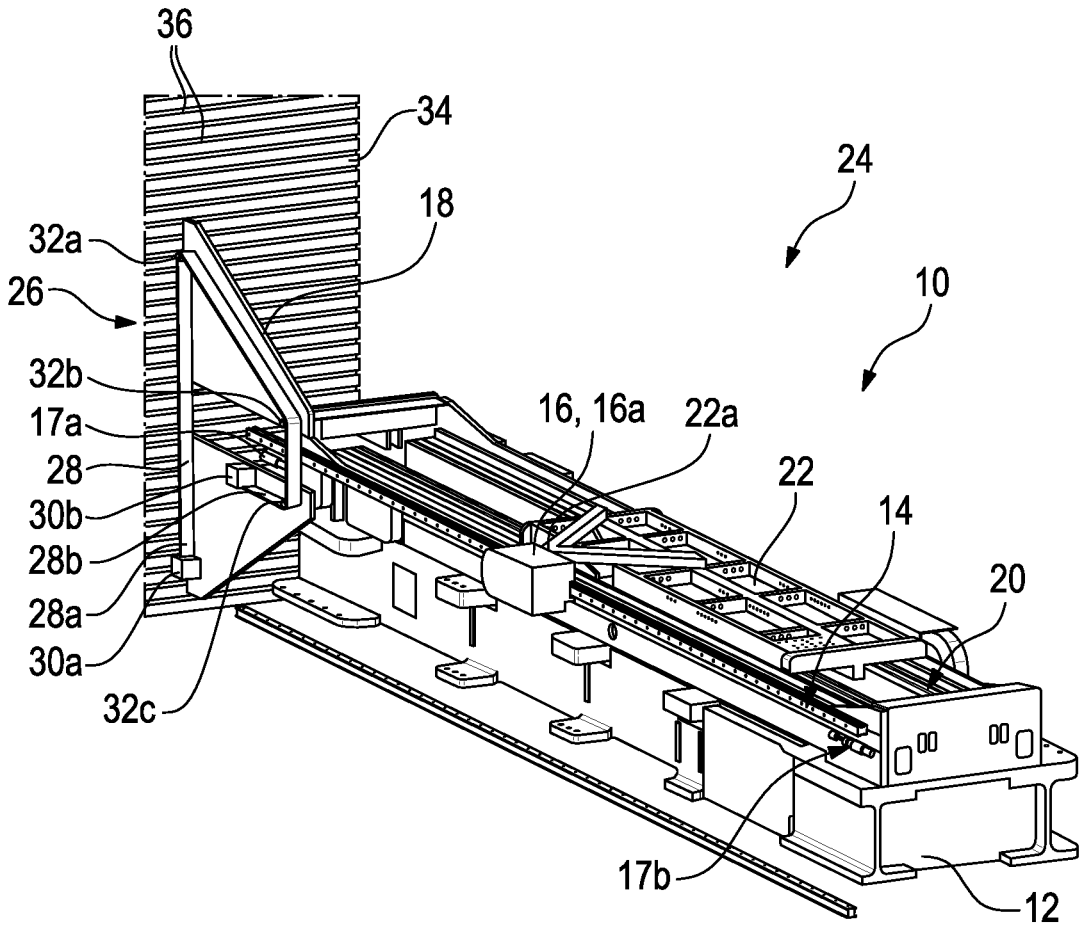
FIG. 3 shows a test setup comprising the test rig of FIG. 2 in a second configuration.

The test setup 24 may also be designed according to a second configuration as seen in FIG. 3.

The test setup 24 according to the second configuration differs from the test setup 24 according to the first configuration only by the fact that the impact unit 16 is connected to the drive interface 22, while being adapted to be decoupled. To this end, the decoupling mechanism 22a is used.

For the rest, the foregoing explanations can be referred to.

Figure 4:
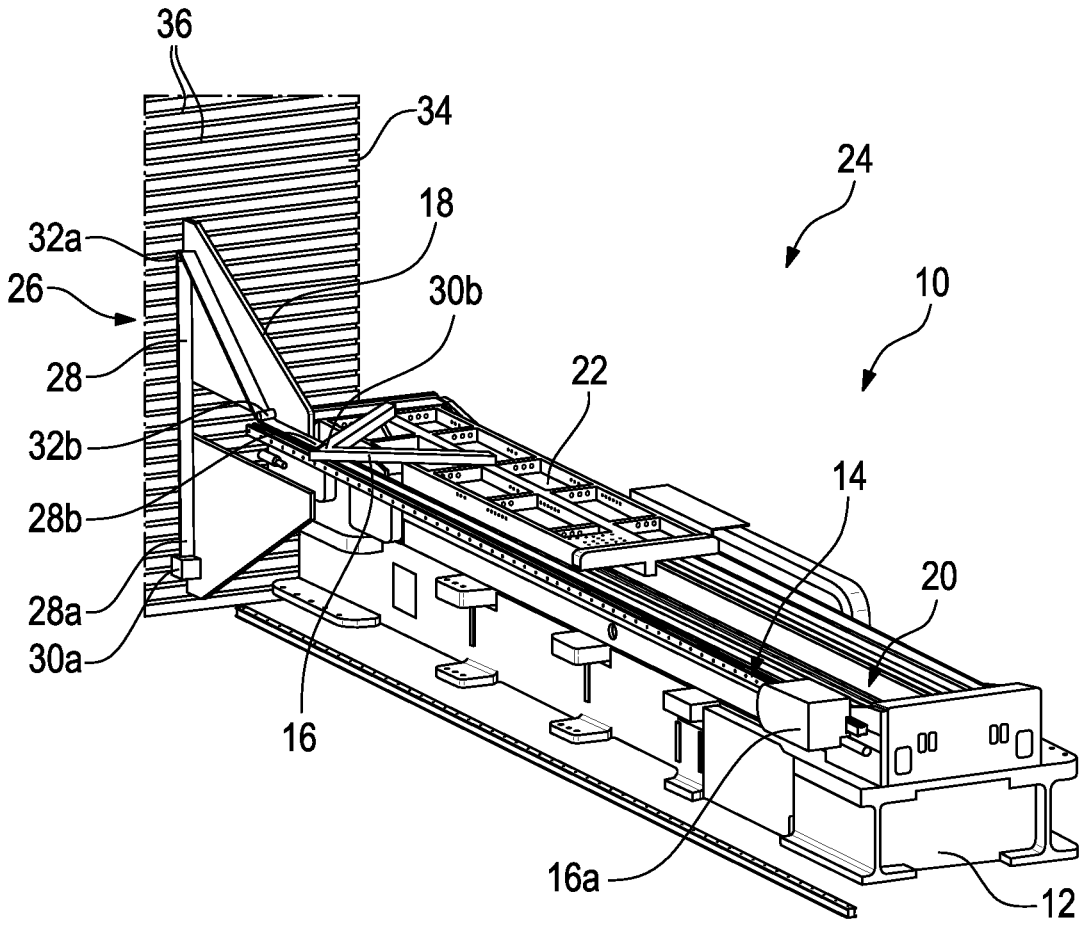
FIG. 4 shows a test setup comprising the test rig of FIG. 2 in a third configuration.

Also, the test setup 24 may be designed according to a third configuration which is illustrated in FIG. 4.

In so doing, only the differences from the first and second configurations shall be discussed.

The second end 28b of the webbing 28 is now attached to the impact unit 16 by means of the second attachment interface 30b.

The first end 28a is secured to the holding unit 18 at the same position as in the first and second configurations by means of the first attachment interface 30a.

Thus, the impact unit 16 is coupled to the holding unit 18 via the webbing 28.

In addition, only two wrapping elements 32a, 32b are provided on the holding unit 18 in this case.

Again, the impact unit 16 is drivingly connected rigidly to the linear drive unit 20 via the drive interface 22. Tensile load can thus be exerted on the webbing 28 by means of the impact unit 16.

In the third configuration, the mass element 16a is not required. Therefore, it is positioned at one end of the linear guide 14 at a maximum distance from the holding unit 18.

The test setup 24 can also take a fourth configuration which is evident of FIG. 5. In this case, again only the differences from the afore-mentioned configurations shall be discussed.

The webbing 28 is arranged, as in the third configuration according to FIG. 4, on the holding unit 18.

Moreover, again the second end 28b of the webbing 28 is attached to the impact unit 16 via a second attachment interface 30b.

Consequently, in the fourth configuration, too, the impact unit 16 is coupled to the holding unit 18 via the webbing 28.

In contrast to the third configuration, the impact unit 16 is equipped with the mass element 16a in this case.

The holding unit 18 in this case is drivingly connected rigidly to the linear drive unit 20 via the drive interface 22. The holding unit 18 can thus be linearly moved by means of the linear drive unit 20.

For this purpose, the holding unit 18 is guided in the horizontal direction via another linear guide rail 14c.

Correspondingly, the impact unit 16 is not connected directly to the drive interface 22 or the linear drive unit 20.

The test setup 24 according to FIGS. 2 to 5 serves to test a seat belt system 26 that is provided for installation on a B pillar of a vehicle.

FIGS. 6 to 13 show various alternatives for arranging the webbing 28 or, more generally, the seat belt system 26 on the holding unit 18 and the impact unit 16.

In all alternatives shown in FIGS. 6 to 13, the impact unit 16 is coupled to the holding unit 18 via the webbing 28.

Therefore, these alternatives are alternatives to the fourth configuration of FIG. 5.

FIG. 6 illustrates a first alternative in which the first end 28a of the webbing 28 is connected to a belt retractor 38.

The belt retractor 38 is secured to the holding unit 18 via the first attachment interface The second end 28b of the webbing 28 is attached, as before, to the holding unit 18 via the second attachment interface 30b.

Starting from the first end 28a, the webbing 28 at first passes a deflecting unit 40 that is attached to the holding unit 18 and deflects the webbing.

Along the course of the webbing 28, two wrapping elements 32a, 32b are connected thereto which are also attached to the holding unit 18.

In addition, on the impact unit 16 two further wrapping elements 32c, 32d are provided which frictionally interact with the webbing 28.

An additional wrapping element 32e is attached again to the holding unit 18.

In the first alternative, the impact unit 16 is thus coupled to the holding unit 18 by providing the wrapping elements 32c, 32d around which the webbing 28 is laid on the holding unit 18.

Moreover, the deflecting unit 40 is designed as a sensor unit 42 comprising a force measuring unit in the shown embodiment. Therefore, a force acting on the webbing 28 can be detected by means of the sensor unit 42.

A second alternative is shown in FIG. 7.

In contrast to the first alternative of FIG. 6, the webbing 28 is guided in this case only around a single wrapping element 32a on the holding unit 18.

The second alternative further differs from the first alternative in that the second end 28b of the webbing 28 is attached to the impact unit 16 via the second attachment interface 30b. At this position, a load cell for measuring the webbing load can also be accommodated. For the rest, the foregoing explanations may be referred to.

Via the arrangements of the webbing 28 in FIGS. 6 and 7 loads can be simulated which in reality occur in webbings that are mounted on a B pillar of a vehicle.

Figure 8:
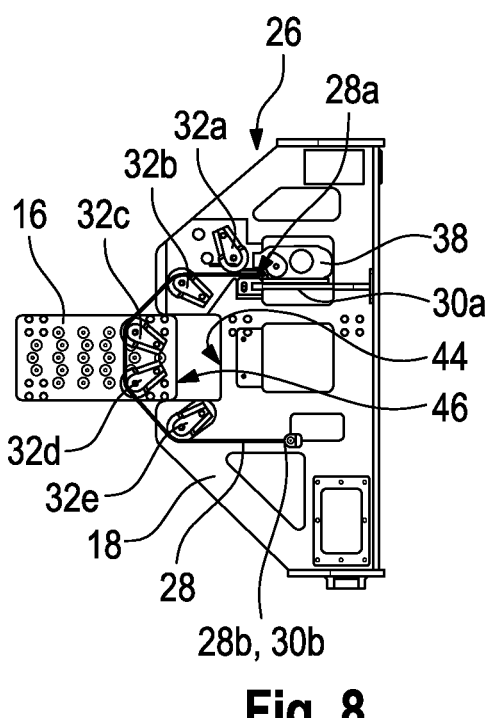

FIG. 8 illustrates a third alternative.

This alternative corresponds to the first alternative of FIG. 6 as regards the wrapping elements 32a to 32e and the attachment of the second end 28b of the webbing 28.

However, in this case the belt retractor 38 is positioned at a different place on the holding unit 18.

This alternative serves to simulate loads acting on a webbing 28 as they occur on a back seat where the belt retractor is integrated in a backrest.

Since the belt retractor 38 in the third alternative is positioned above the attachment interface 30a, one speaks also of an upright arrangement of the belt retractor 38.

Figure 9:
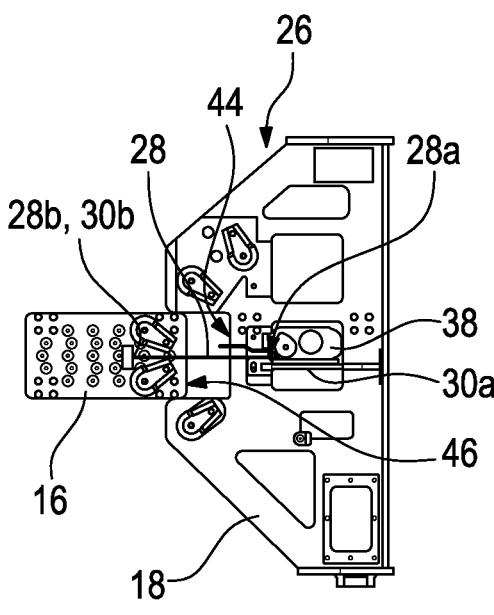

FIG. 9 illustrates a fourth alternative.

This alternative constitutes substantially a combination of the second alternative of FIG. 7 and the third alternative of FIG. 8.

However, in this case the webbing 28 is not deflected and contacts none of the wrapping elements.

Rather, its first end 28a is connected to the holding unit 18 via the belt retractor 38 that is arranged upright.

The second end 28b is attached, as in the second alternative according to FIG. 7, to the impact unit 16.

The alternative according to FIG. 9, too, serves to simulate loads acting on a webbing 28 provided for use on a back seat, with the belt retractor being integrated in a backrest.

Figure 10:
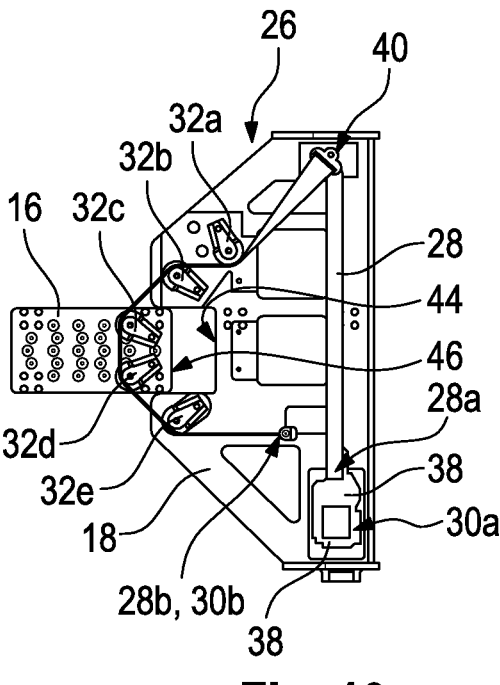

A fifth alternative is shown in FIG. 10.

This alternative constitutes a variant of the first alternative in which the deflecting unit 40 is designed differently.

In the fifth alternative, the deflecting unit 40 is formed by a so-called D ring which imparts, apart from the deflection, also a twist to the webbing 28.

In addition, compared to the first alternative, the belt retractor 38 is arranged to be rotated by 90° about an axis corresponding to the webbing extension.

The deflecting unit 40 is not designed as a sensor unit in the fifth alternative.

Figure 11:
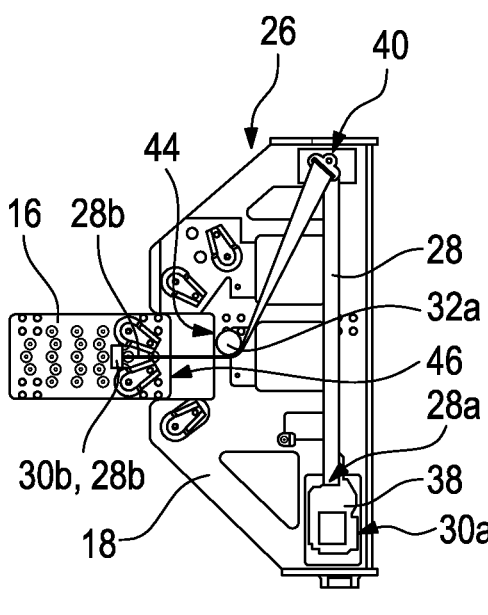

FIG. 11 shows a sixth alternative.

This is a variant of the second alternative of FIG. 7. The modifications compared to FIG. 7 correspond to those modifications which have been imparted to the fifth alternative of FIG. 10 compared to the first alternative of FIG. 6.

Consequently, the deflecting unit 40 was designed as D ring.

The belt retractor 38 was moreover attached to the holding unit 18 rotated by 90° compared to its position in FIG. 7.

A seventh alternative is shown in FIG. 12.

This alternative corresponds substantially to the third alternative according to FIG. 8. In this case, only the belt retractor 38 is disposed below the attachment interface 30a. In this context, one also speaks of a suspended arrangement of the belt retractor 38. For the rest, the remarks on the third alternative can be referred to.

In FIG. 13, an eighth alternative is illustrated.

This alternative corresponds substantially to the fourth alternative of FIG. 9, only the belt retractor 38 being arranged to be suspended in this case.

For the rest, the remarks on FIG. 9 can be referred to.

The seventh and eighth alternatives thus also serve to simulate an arrangement of the webbing 28 which is commonly found in the area of back seats.

Figure 15:
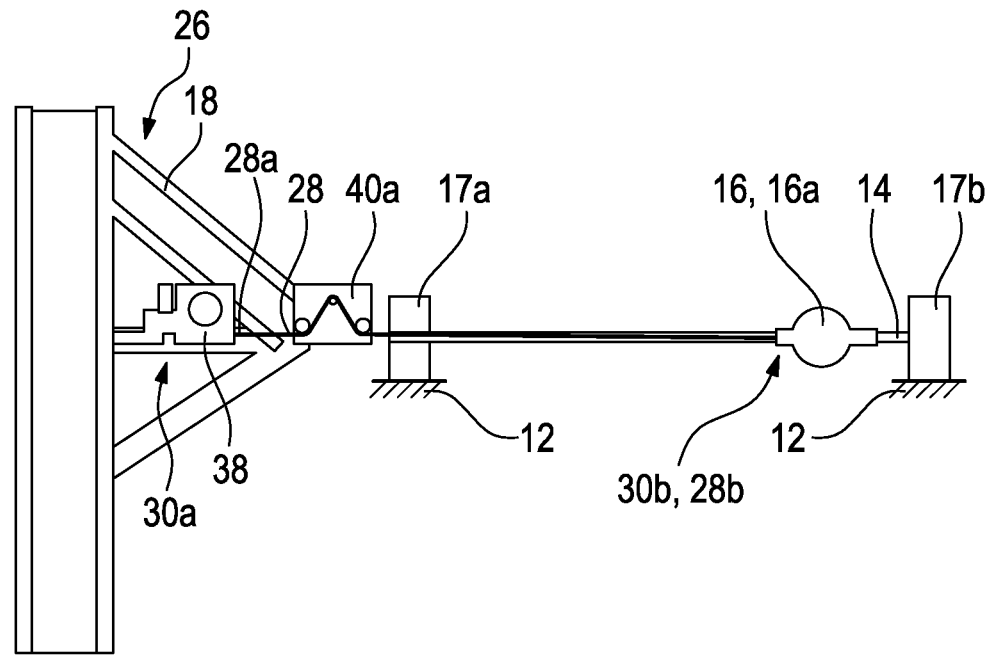
Figure 16:
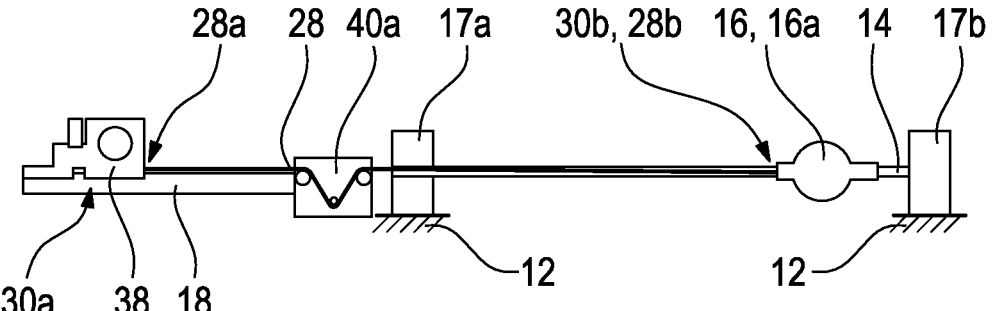

FIGS. 14 to 16 illustrate alternatives which are associated with the third configuration of FIG. 4.

In FIG. 14 a first alternative is shown.

Based on the representation in FIG. 4, in this alternative the first end 28a of the webbing 28 is attached to the holding unit 18 via a belt retractor 38.

Moreover, the deflecting unit 40 in this case is realized as D ring which entails, as already explained, a certain twist of the webbing 28.

The second end 28b of the webbing 28 is coupled, as before, via the second attachment interface 30b to the impact unit 16, the impact unit 16 which is also equipped with the mass element 16a in this case.

The webbing 28 is additionally connected to a deflecting unit 40a.

The latter serves to simulate a so-called belt slack, via a section of the webbing 28 which is loose or not tightly adjacent to a vehicle occupant in real operation.

The arrangement of the seat belt system 26 corresponds to the arrangement on a B pillar of a vehicle.

FIG. 15 illustrates a second alternative.

The first end 28a of the webbing 28 is again connected to a belt retractor 38. The latter is mounted on the holding unit 18 via the first attachment interface 30a in the so-called upright arrangement.

Unlike the first alternative of FIG. 14, now the webbing 28 merely interacts with the deflecting unit 40a which serves to simulate the belt slack.

The arrangement of the seat belt system 26 in FIG. 15 corresponds to an arrangement in a backrest, for example of a back seat.

A third alternative is illustrated in FIG. 16.

The holding unit 18 is shown in a very simplified manner.

Figure 17:
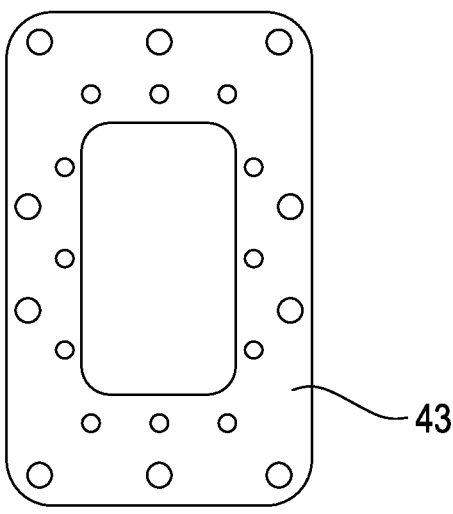
FIG. 17 shows a detail view of a local reinforcing element for securing a webbing end or a belt retractor.

FIG. 17 further illustrates a local reinforcing element 43 in the form of a connecting plate. The latter is installed specifically between a belt retractor 38 and the holding unit 18, more precisely the attachment interface 30a, 30b so as to locally reinforce the holding unit 18. In addition, when the connecting surface to the holding unit is standardized, individual adaptation is thus realized for belt retractors having different fittings.

In case that such reinforcement is not required or not desired, the reinforcing element 43 can be omitted.

Figure 18:
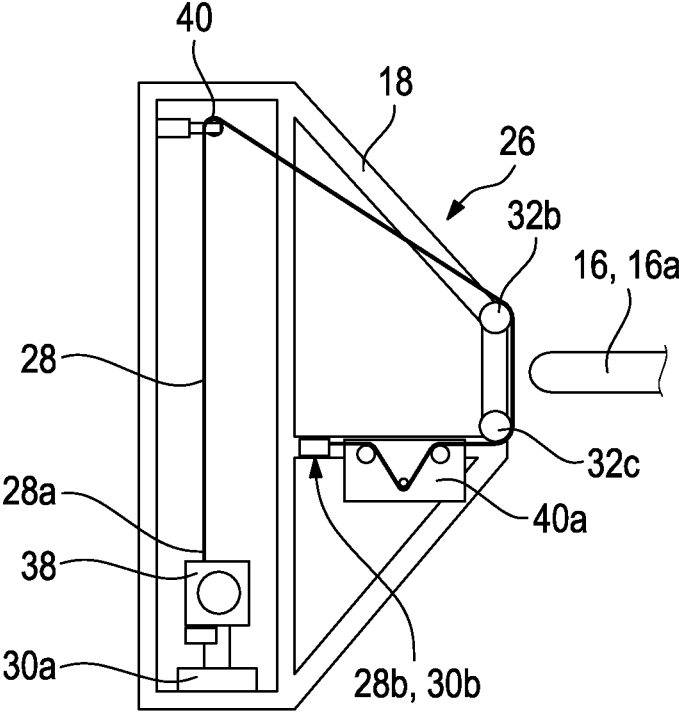
FIG. 18 and FIG. 19 show detail views of different alternatives to the first configuration of FIG. 2 and to the second configuration of FIG. 3.
Figure 19:
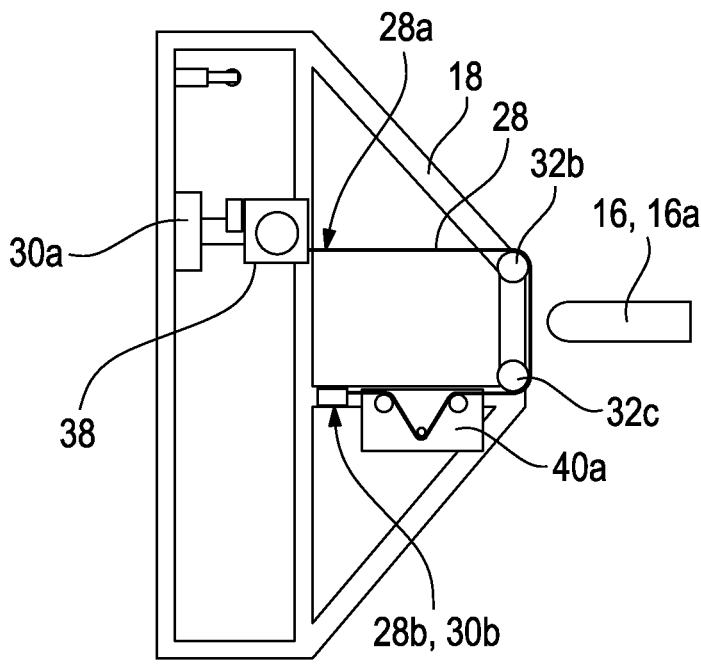

FIGS. 18 and 19 show further alternatives associated with the first configuration of FIG. 2 and the second configuration of FIG. 3.

FIG. 18 shows a first alternative.

This alternative differs from the representations in FIGS. 2 and 3 by the fact that the first end 28*a* of the webbing 28 is connected to a belt retractor 38 which is connected to the holding unit 18 via the first attachment interface 30*a*.

The second end 28*b* of the webbing 28 is attached, as before, directly to the holding unit 18 via the second attachment interface 30*b*.

Furthermore, the wrapping element 32*a* was replaced with a deflecting unit 40.

In addition, the deflecting unit 40*a* known already of FIGS. 14 to 16 is provided between the wrapping element 32*c* and the second end 28*b* to simulate the belt slack.

The setup of FIG. 18 helps simulate the load of an arrangement on one of the B pillars in the vehicle.

A second alternative is shown in FIG. 19.

This alternative differs from the alternative of FIG. 18 by the fact that the belt retractor 38 in this case is positioned at a different place of the holding unit 18.

Further, the deflecting unit 40 is no longer used in this case.

For the rest, i.e., regarding the attachment interface 30*b*, the wrapping elements 32*b*, 32*c* and the deflecting unit 40*a*, the alternative of FIG. 19 corresponds to the alternative of FIG. 18 which therefore can be referred to.

Figure 20:
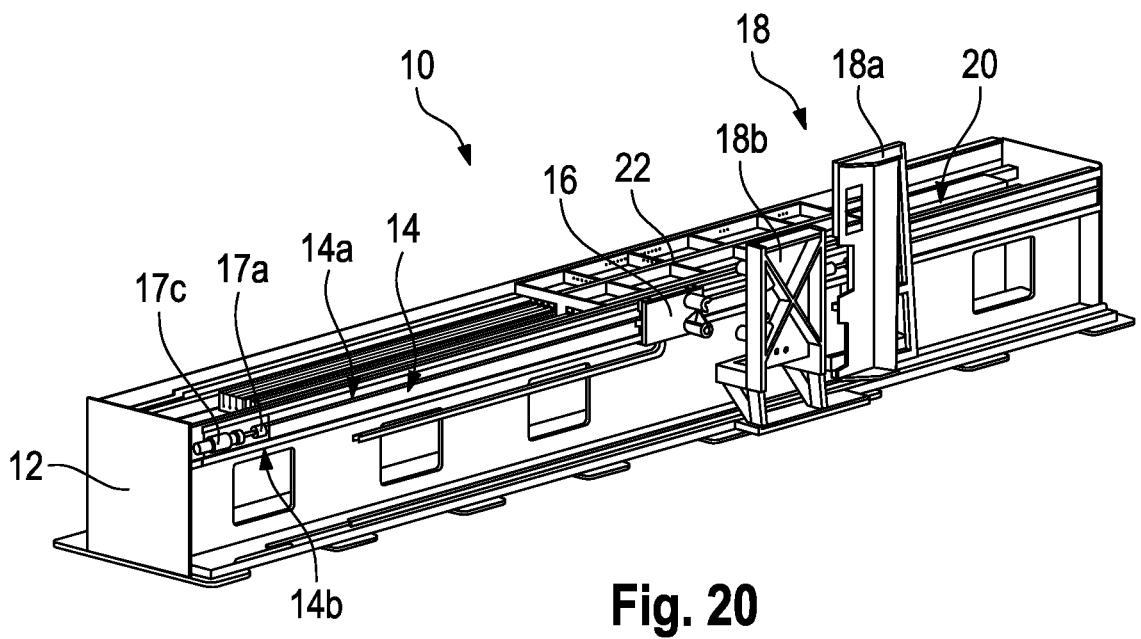
FIG. 20 shows a test rig according to the invention as set forth in an alternative embodiment to the first configuration of FIG. 2 and to the second configuration of FIG. 3 in a perspective view.

In FIG. 20, a test rig 10 according to an alternative embodiment is shown. This embodiment is different from the embodiment according to FIG. 1 in that the holding unit 18 is two-part and, thus, comprises a first part 18*a* and a second part 18*b*.

Both the first part 18*a* and the second part 18*b* are stationary relative to the test rig base 12.

In the course of mounting the holding unit 18, a distance of the first part 18*a* from the second part 18*b* can be adjusted.

FIGS. 21 to 28 illustrate different alternative test setups 24 that make use of the test rig 10 of FIG. 20.

For reasons of clarity, only the holding unit 18, the impact unit 16 and the seat belt system 26 to be tested are shown in each case.

Figure 21:
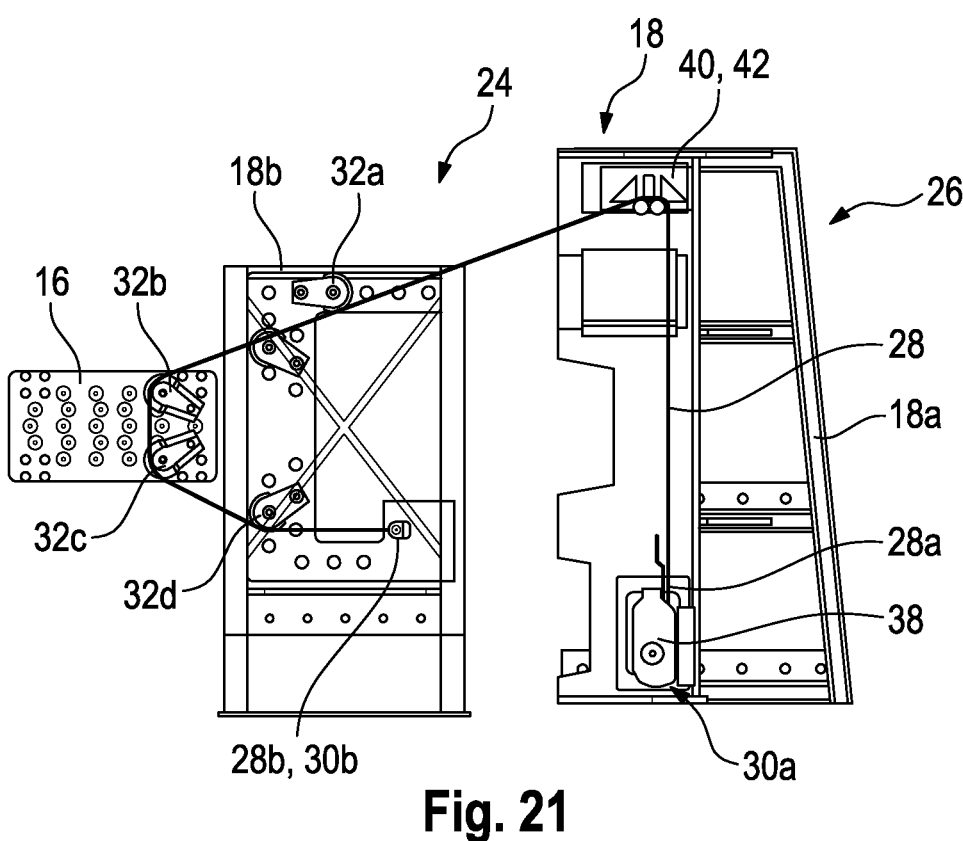
FIG. 21 to FIG. 28 show detail views of different variants of a test setup comprising the test rig according to FIG. 2.

In FIG. 21 a first alternative is visible.

The first end 28*a* of the webbing 28 is connected to the first part 18*a* via a belt retractor 38 and the attachment interface 30*a*.

In addition, on the first part 18*a* a deflecting unit 40 is provided which, on the one hand, deflects the webbing 28 and, on the other hand, acts as sensor unit 42 which can detect a force.

The webbing is additionally laid around a wrapping element 32*a* provided on the second part 18*b*.

Moreover, on the impact unit 16 two wrapping elements 32*b*, 32*c* are provided around which the webbing 28 is equally laid.

An additional wrapping element 32*d* is again disposed on the second part 18*b*.

The second end 28*b* of the webbing 28 is secured to second part 18*b* via the second attachment interface 30*b*.

Figure 22:
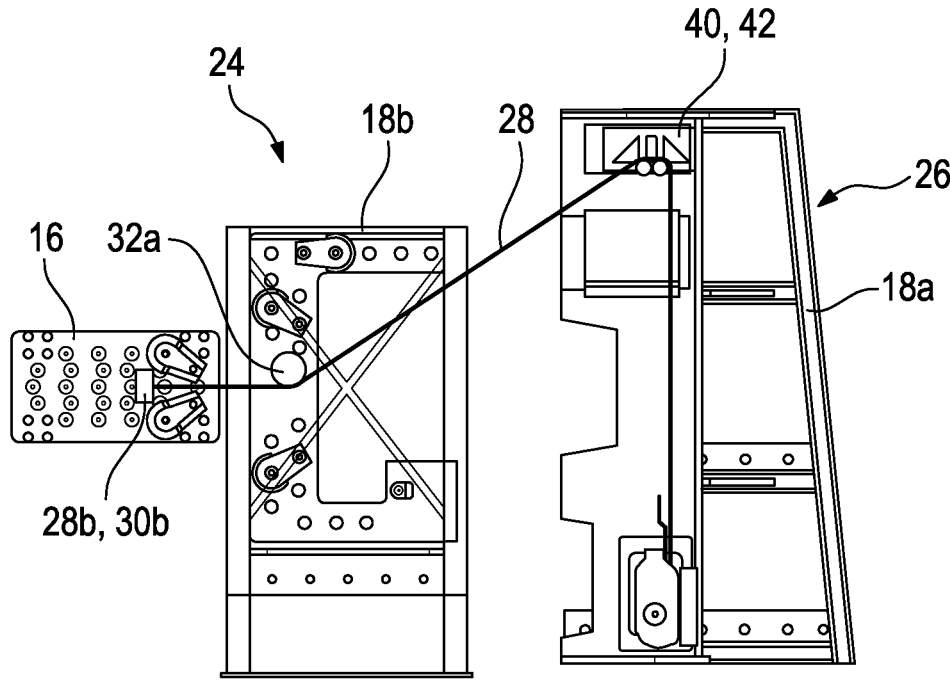

A second alternative is shown in FIG. 22.

The first part 18*a* is designed in the same way as in the first alternative of FIG. 21.

In contrast to that, however, one single wrapping element 32*a* is provided on the second part 18*b* in this case.

Moreover, now the second end 28*b* of the webbing 28 is secured to the impact unit 16 via the second attachment interface 30*b*.

The alternatives of FIGS. 21 and 22 serve to test a seat belt system 26 which in reality is used on a B pillar of a vehicle.

Figure 23:
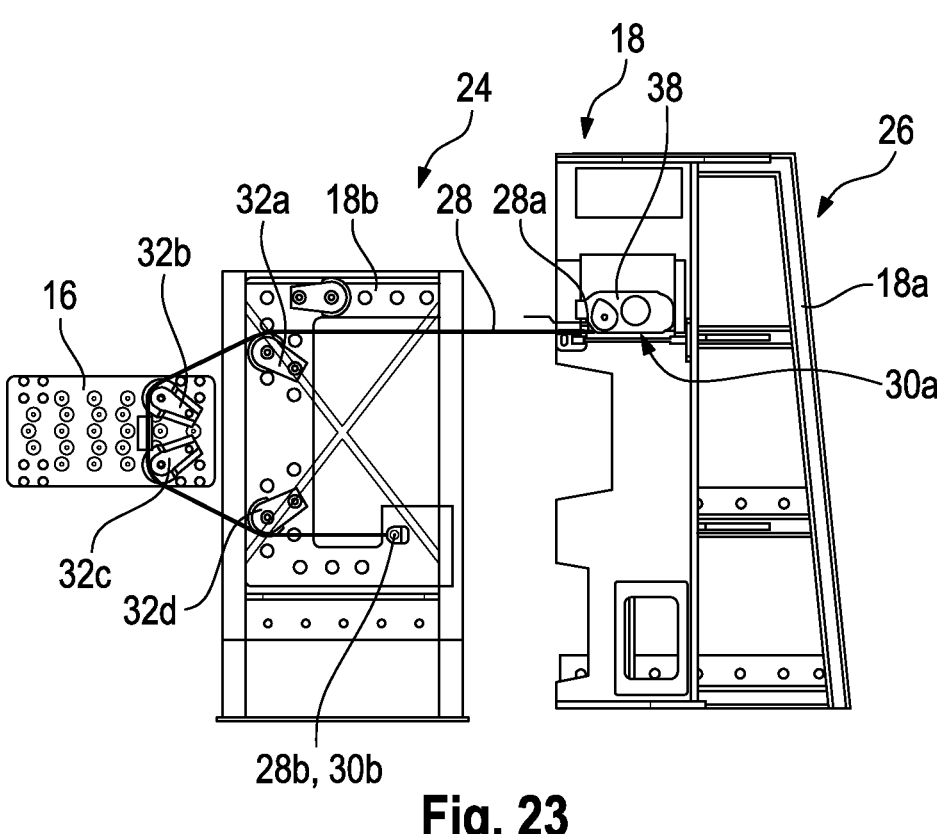

A further third alternative is illustrated in FIG. 23.

This alternative differs from the first alternative of FIG. 21 only regarding the structure of the first part 18*a*.

In this case, the belt retractor 38 is connected to the first part 18*a* at a different place.

In addition, no deflecting unit 40 is provided.

Figure 24:
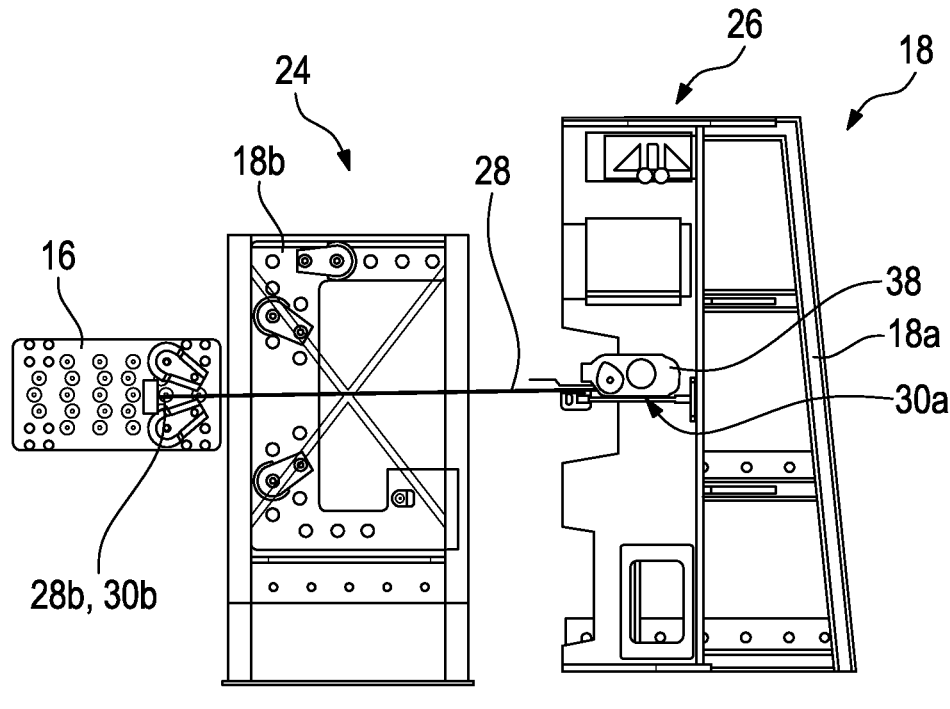

A fourth alternative is shown in FIG. 24.

This alternative substantially constitutes a combination of the second alternative of FIG. 22 and the third alternative of FIG. 23.

The belt retractor 38 is connected to the first part 18*a* in an upright arrangement via the first attachment interface 30*a*.

The second end 28*b* of the webbing 28 is secured to the impact unit 16 via the second attachment interface 30*b*.

The second part 18*b* has no function in this alternative.

By means of the alternatives from the FIGS. 23 and 24, seat belt systems 26 which are integrated in a seat back, for example, can be tested.

Figure 25:
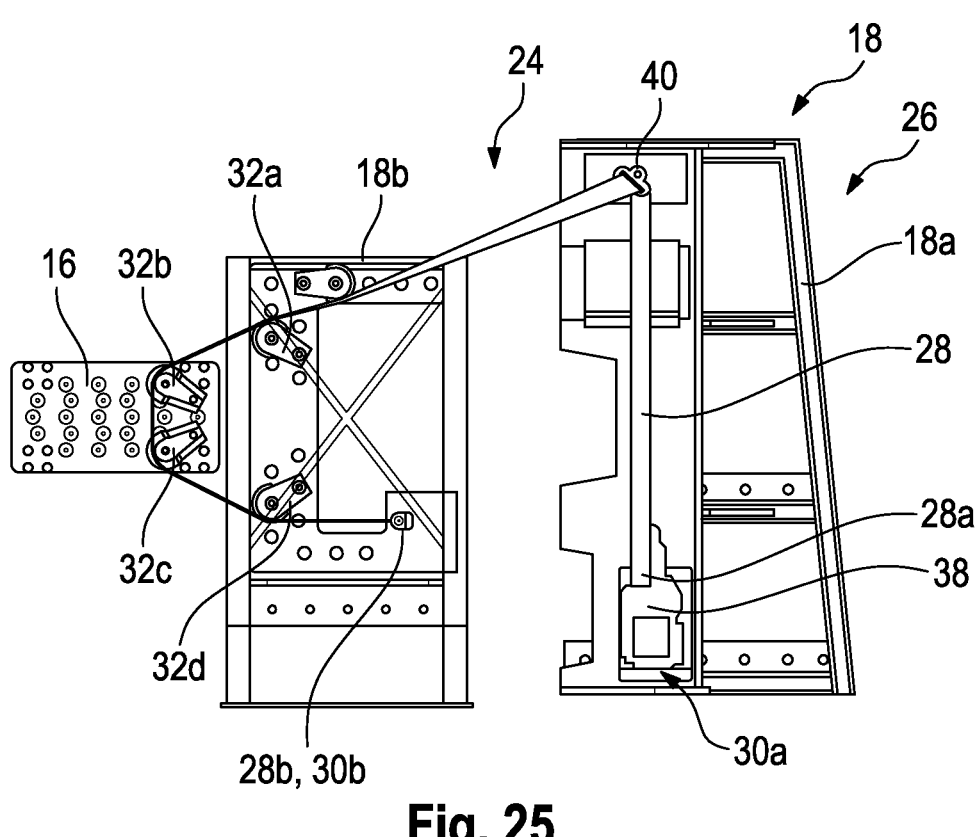

FIG. 25 illustrates a fifth alternative which differs from the first alternative of FIG. 21 by two aspects.

On the one hand, the deflecting unit 40 is designed as a so-called D ring.

A sensor unit 42 is no longer provided.

The belt retractor 38 is moreover rotated by 90° and attached to the first part 18*a* via the first attachment interface 30*a*. The rotation by 90° is performed about an axis corresponding to the extension of the webbing 28.

For the rest, the fifth alternative corresponds to the first alternative of FIG. 21.

Figure 26:
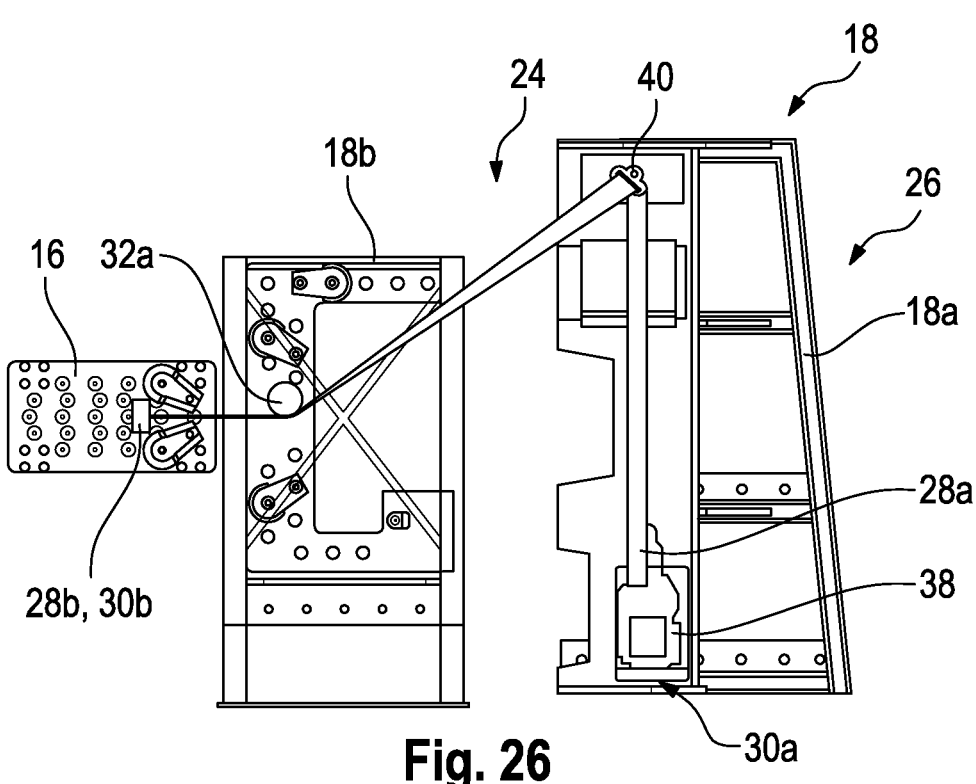

A sixth alternative is shown in FIG. 26.

This alternative largely corresponds to the second alternative of FIG. 22, wherein it was modified in the same way as the fifth alternative of FIG. 25 compared to the first alternative of FIG. 21.

Hence, compared to the second alternative of FIG. 22, the deflecting unit 40 is designed as a D ring.

In addition, the belt retractor 38 is rotated by 90° and attached to the first part 18*a*.

By the alternatives of FIGS. 25 and 26, seat belt systems 26 that are mounted on B pillars of a vehicle can be tested.

Figure 27:
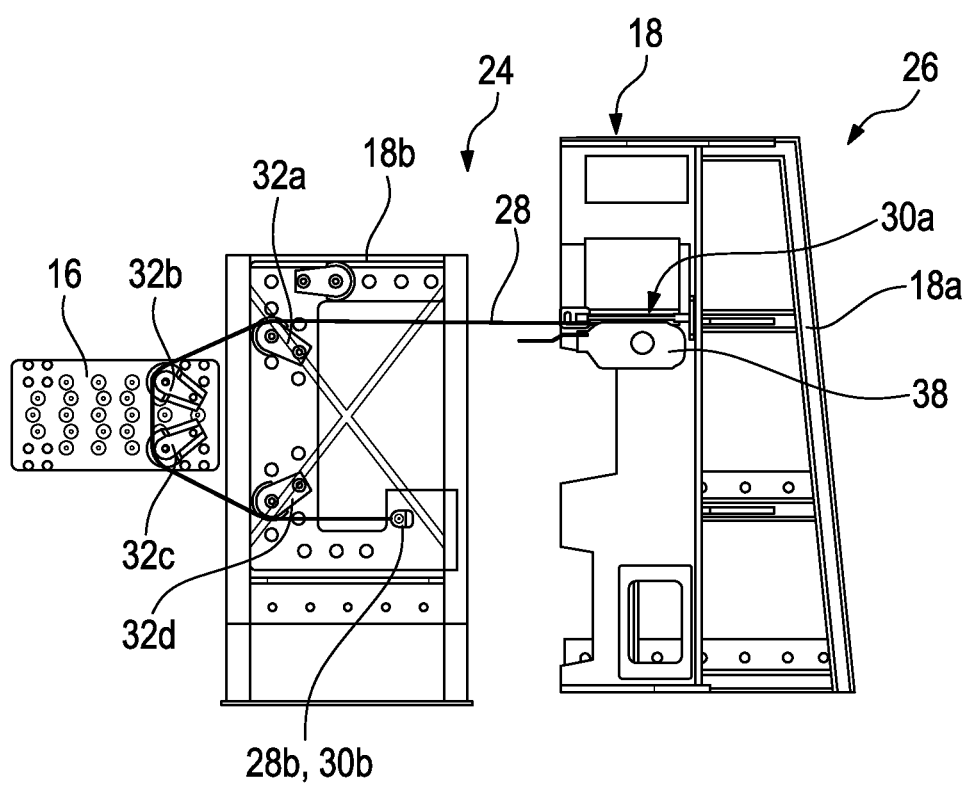

A seventh alternative is illustrated in FIG. 27.

This alternative is different from the third alternative of FIG. 23 only in that the belt retractor 38 in this case is disposed to be suspended, i.e., below the first attachment interface 30*a*.

For the rest, the remarks on the third alternative in FIG. 23 can be referred to.

Figure 28:
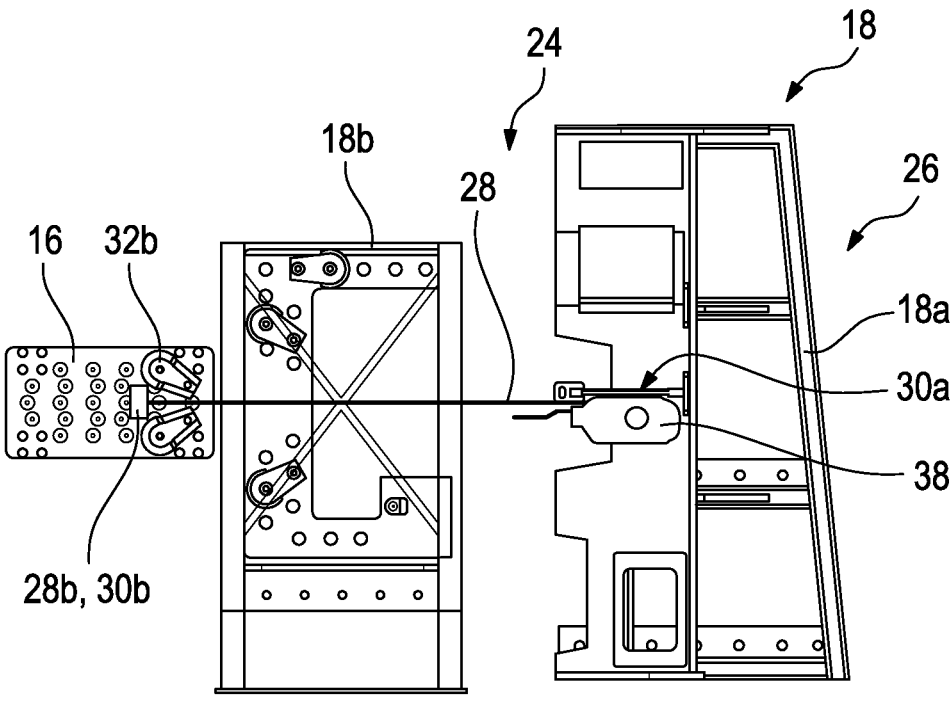

FIG. 28 illustrates an eighth alternative.

This alternative is different from the fourth alternative of FIG. 24 only in that in this case the belt retractor 38 is disposed below the first attachment interface 30*a*. Thus, the belt retractor takes a suspended position.

In the foregoing, numerous alternatives of the test rig 10 and, thus, of implemented test setups 24 were illustrated which are different specifically regarding the arrangement of the seat belt system 26 but also regarding the component coupled to the drive interface 22.

The differences relate, inter alia, to the position and the design of the attachment interfaces 30*a*, 30*b*, the number and the position of the wrapping elements 32*a*, 32*b*, 32*c*, 32*d*, 32*e* as well as the number and the position of the deflecting units 40, 40*a*.

It is understood that the test rig 10 is also suitable to implement test setups 24 in which individual elements or partial aspects of the afore-mentioned alternatives are combined.

Hereinafter the operation of the test rig 10 shall be explained.

A seat belt system 26 comprising a webbing 28 is attached to the holding unit 18.

In this context, in the test setup according to the first configuration of FIG. 2, the impact unit 16 is made to contact the webbing 28 by means of the linear drive unit 20.

The impact unit 16 thus causes a load of the webbing that constitutes a test load.

More precisely, the impact unit 16 is moved along a predetermined distance, speed and/or acceleration profile onto the webbing 28.

In the test setup 24 according to the second configuration of FIG. 3, the impact unit 16 is initially accelerated by means of the linear drive unit 20. This takes place, for example, until the impact unit 16 has reached a predetermined position, speed and/or acceleration.

After that, the impact unit 16 is decoupled from the linear drive unit 20, more precisely from the drive interface 22, by means of the decoupling mechanism 22a.

Thus, the impact unit 16 slides without any driving connection along the linear guide 14 toward the webbing 28 and gets in contact with the latter. In this way, too, a test load is exerted on the webbing.

Of preference, decoupling is completed before the impact unit 16 gets in contact with the webbing 28.

In the test setup 24 according to the third configuration of FIG. 4, the second end 28b of the webbing 28 is connected to the impact unit 16.

The impact unit 16, in turn, is displaced along a predetermined distance, speed and/or acceleration profile by means of the linear drive unit 20 and, thus, introduces load into the webbing.

In the configuration of the test setup according to FIG. 5, the holding unit 18 is drivingly coupled rigidly to the linear drive unit 20 via the drive interface 22.

The impact unit 16 is coupled to the holding unit 18 only via the webbing 28.

There is no drivable direct coupling of the impact unit 16 to the drive interface 22.

Substantially two method variants are possible.

In a first method variant, the holding unit 18 is displaced along a predetermined distance, speed and/or acceleration profile by means of the linear drive unit 20 in a direction facing away from the impact unit 16. Simply put, the impact unit 16 is thus drawn behind the holding unit 18 via the webbing 28.

In this variant, the limit stop 17a is disposed such that at one end of the linear guide 14 shown on the left in FIG. 5 an area is formed into which the holding unit 18 can be moved, but not the impact unit 16. This is prevented by the limit stop 17a.

In other words, the limit stop 17a is thus disposed relative to the holding unit 18 in such a way that it prevents the holding unit 18 from being contacted undesirably by the impact unit 16. Consequently, a collision of the holding unit 18 with the impact unit 16 is suppressed.

In a second method variant, the holding unit 18 is first put against the impact unit 16.

To this end, a driving surface 44 is provided on the holding unit 18 and a driving counter-surface 46 is provided on the impact unit 16.

Then the holding unit 18 is displaced by means of the linear drive unit 20 toward the impact unit 16, wherein it carries the impact unit 16 along the linear guide 14.

Hence, both the holding unit 18 and the impact unit 16 are displaced along a predetermined distance, speed and/or acceleration profile in a direction in which the holding unit 18 is moved toward the impact unit 16.

When a predetermined position, speed and/or acceleration is/are reached, the holding unit 18 is decelerated or moved in a direction facing away from the impact unit 16. Consequently, it is then lifted off the impact unit 16 along a predetermined distance, speed and/or acceleration profile.

In this way, a load of the webbing 28 is caused which results from the relative speed prevailing between the impact unit 16 and the holding unit 18.

It is understood that the afore-mentioned alternatives of the method for operating the test rig 10 can also be readily carried out when the test rig is set up according to one of the alternatives shown in FIGS. 6 to 13.

In the test rig 10 according to FIG. 20, the holding unit 18 is stationary so that the remarks on the third configuration according to FIG. 4 apply analogously.

The invention claimed is:

1. A test rig (10) for testing at least one component of a seat belt system (26) having a webbing, comprising
   a test rig base (12),
   a holding unit (18) for mounting the at least one component of the seat belt system (26) to be tested,
   an impact unit (16) which is configured to apply a load to the at least one component of the seat belt system (26) to be tested and which is supported on the test rig base (12) to be substantially horizontally movable relative to the holding unit via a linear guide (14) in the operating state of the test rig (10), and
   a controlled linear drive unit (20) which includes a drive interface (22),
   the drive interface being configured to connect the holding unit to the linear drive unit so that the linear drive unit directly moves the holding unit relative to the test rig base, the drive interface being configured to connect the impact unit to the linear drive unit so that the linear drive unit directly moves the impact unit relative to the test rig base.

2. The test rig (10) according to claim 1, wherein the impact unit (16) comprises a test mass.

3. The test rig (10) according to claim 1, wherein the linear drive unit (20) comprises an electric drive system.

4. The test rig (10) according to claim 1, wherein at least one wrapping element (32a, 32b, 32c, 32d, 32e) is attached to the holding unit (18) and/or to the impact unit (16), wherein each wrapping element (32a, 32b, 32c, 32d, 32e) includes at least one wrapping surface for frictional interaction with the webbing (28).

5. The test rig (10) according to claim 1, wherein the holding unit (18) and/or the impact unit (16) include(s) an attachment interface (30a, 30b), wherein each attachment interface (30a, 30b) is configured to secure the webbing (28) and/or to secure a belt retractor (38).

6. The test rig (10) according to claim 1, wherein the holding unit (18) and/or the impact unit (16) include(s) at least one deflecting unit (40, 40a) for deflecting the webbing (28).

7. The test rig (10) according to claim 1, wherein the holding unit (18) and/or the impact unit (16) include(s) at least one sensor unit (42), specifically wherein the sensor unit (42) comprises a force measuring unit, an acceleration measuring unit, a speed measuring unit and/or a distance measuring unit.

8. The test rig (10) according to claim 1, wherein the holding unit (18) includes a driving surface (44) and the impact unit (16) includes a driving counter-surface (46) so that the holding unit (18) can carry the impact unit (16) along the linear guide (14), when the driving counter-surface (46) is adjacent to the driving surface (44).

9. The test rig (10) according to claim 1, wherein the drive interface (22) comprises a decoupling mechanism (22*a*) that releases one of the impact unit (16) and the holding unit (18) from the drive interface (22) of the linear drive unit (20) while the one of the impact unit (16) and the holding unit (18) is moving relative to the test rig base (12).

10. The test rig (10) according to claim 1, wherein a limit stop (17*a*, 17*b*) is provided for limiting a movement range of the impact unit (16) along the linear guide (14), in particular wherein the limit stop (17*a*, 17*b*) is provided with a damping unit (17*c*, 17*d*).

11. The test rig (10) according to claim 10, wherein the limit stop (17*a*, 17*b*) is disposed relative to the holding unit (18) such that it prevents the holding unit (18) from being contacted by the impact unit (16).

12. A test setup for testing the at least one component of the seat belt system, comprising the test rig (10) according to claim 1, wherein the webbing (28) is attached to the holding unit (18), and the impact unit (16) is coupled to the holding unit (18) via the webbing (28).

13. A method for operating the test rig (10) according to claim 1, comprising:

attaching the webbing (28) to the holding unit (18), and holding the holding unit (18) stationary relative to the test rig base (10) while the impact unit (16) causes loading onto the webbing (28) by being made to contact the webbing (28) by means of the linear drive unit (20), or holding the holding unit (18) stationary relative to the test rig base (10) while the impact unit (16) is both coupled to the holding unit (18) via the webbing (28) and drivingly connected rigidly to the linear drive unit (20)

via the drive interface (22) so that the impact unit (16) causes loading of the webbing (28) by displacing the impact unit (16) by means of the linear drive unit (20), or drivingly connecting the holding unit (18) to the linear drive unit (20) while the impact unit (16) is coupled to the holding unit (18) via the webbing (28) so that loading of the webbing (28) is caused by the holding unit (18) being displaced by means of the linear drive unit (20).

14. The method according to claim 13, further including accelerating the impact unit (16) by means of the linear drive unit (20) and then decoupling the impact unit from the linear drive unit (20), so that the decoupling is completed before the impact unit (16) gets in contact with the webbing (28) to cause loading of the webbing (28) when holding the holding unit (18) stationary relative to the test rig base (10) while the impact unit (16) causes loading onto the webbing (28) by being made to contact the webbing (28) by means of the linear drive unit (20).

15. The method according to claim 13, further including first moving the holding unit (18) in the direction of the impact unit (16) by means of the linear drive unit (20) while carrying the impact unit (16), and subsequently decelerating the holding unit (18) by means of the linear drive unit (20) or moving the holding unit in a direction facing away from the impact unit (16) to cause loading of the webbing (28) when drivingly connecting the holding unit (18) to the linear drive unit (20) while the impact unit (16) is coupled to the holding unit (18) via the webbing (28) so that loading of the webbing (28) is caused by the holding unit (18) being displaced by means of the linear drive unit (20).

16. The test rig according to claim 1, wherein the holding unit is supported on the test rig base to be horizontally movable relative to the test rig base and the impact unit.

17. The test rig according to claim 1, wherein the impact unit is configured to contact the webbing of the seat belt system to apply the load to the at least one component.

* * * * *